3,038,889
COPOLYMERS OF VINYL ALKYL ETHERS AND ALKOXY-1,3-BUTADIENES

Joginder Lal, Cuyahoga Falls, Ohio, assignor to The Goodyear Tire & Rubber Company, Akron, Ohio, a corporation of Ohio
No Drawing. Filed June 30, 1960, Ser. No. 39,801
14 Claims. (Cl. 260—80.3)

The present invention relates to a process for the copolymerization of vinyl alkyl ethers with alkoxy-1,3-butadienes to produce high molecular weight sulfur-curable elastomers and to said copolymers.

Copolymers of 1-alkoxy-1,3-butadiene and vinyl monomers polymerized with a boron trifluoride catalyst are low molecular weight liquid or semi-solid materials. They may be applied to the surface of metals and be cured to form a protective coating; however, the low molecular weight copolymers are not suitable for making rubber goods.

The principal object of this invention is to provide high molecular weight copolymers of vinyl alkyl ethers and alkoxy-1,3-butadienes which may be sulfur-cured to yield a cured product having a tensile of at least about 1000 pounds per square inch.

Another object of this invention is to provide a process for preparing high molecular weight copolymers of vinyl alkyl ethers and alkoxy-1,3-butadienes which may be sulfur-cured to yield rubbery vulcanizates having good tensile properties.

Other objects and advantages of this invention will be apparent from the specification and claims.

I have found that aluminum hexahydrosulfate catalyzes the polymerization of vinyl alkyl ether with alkoxy-1,3-butadiene to yield high molecular weight copolymers which can be sulfur-cured to yield a cured product having good tensile strength.

Representative examples of the vinyl alkyl ethers useful in this invention are vinyl methyl ether, vinyl ethyl ether, vinyl-n-propyl ether, vinyl isopropyl ether, vinyl-n-butyl ether, vinyl isobutyl ether, and vinyl dodecyl ether. Normally, the alkyl radical of said ether should contain less than about 12 carbon atoms or its copolymers with alkoxy-1,3-butadiene will tend to be resinous instead of rubbery.

The alkoxy-1,3-butadienes of interest in this invention are the ones having alkoxy radicals containing no more than about 6 carbon atoms. Representative examples of these alkoxy derivatives of butadiene are 1-methoxy-1,3-butadiene; 1-ethoxy-1,3-butadiene; 1-propoxy-1,3-butadiene; 1-butoxy-1,3-butadiene; 2-methoxy-1,3-butadiene; 2-ethoxy-1,3-butadiene; 2-propoxy-1,3-butadiene; 2-butoxy-1,3-butadiene; 1-pentoxy-1,3-butadiene and 1-hexoxy-1,3-butadiene.

The catalyst useful in this invention to copolymerize vinyl alkyl ethers and alkoxy-1,3-butadienes to give high molecular weight copolymers is the acid aluminum sulfate (the preparation of which is described in detail in U.S. Patent No. 2,549,921). A highly active aluminum sulfate is obtained by treating commercial aluminum sulfate ($Al(SO_4)_3 \cdot 18H_2O$) with sulfuric acid. The active component of the catalyst is aluminum hexahydrosulfate of the formula $Al_2(SO_4)_3 \cdot 3H_2SO_4 \cdot 7H_2O$. With this catalyst, copolymers of high molecular weight can be prepared even at room temperature and at moderately decreased temperatures, as for example between $+20°$ C. and $-20°$ C.

The rate of reaction may be controlled by varying the amount of catalyst used. For example, the rate of reaction may be increased by increasing the catalyst. Based on vinyl alkyl ether, the percent by weight of catalyst normally can vary from about 0.01 to 0.5, although lower and higher percentages may be used by suitably adjusting the temperature.

The polymerization can be carried out in bulk or in the presence of solvents or diluents and may be continuous or discontinuous. Polymerization in a solvent offers the advantage that heat can be disssipated faster. Examples of suitable classes of solvents for this purpose are the hydrocarbons, the halogenated hydrocarbons, and the ethers.

Representative examples belonging to these classes are benzene, toluene, cyclopentane, cyclohexane, pentane, hexane, heptane, octane, mixtures of these hydrocarbons, chloroform, methylene dichloride, diethyl ether, dipropyl ether, dibutyl ether, etc. Normally, about 1 to 10 parts of solvent for each part of vinyl alkyl ether can be used with the preferred range being about 3 to 6 parts for each part of vinyl alkyl ether.

These copolymers have different properties depending on the proportion of the different monomers. Copolymers which have been produced from mixtures with a content of 90 to 99.5%, preferably 96 to 98% by weight of vinyl alkyl ethers are especially of interest for working up into rubberlike masses which have tensile strengths in excess of 1000 lbs. per square inch, useful for making rubber goods. These copolymers can be pressed and extruded. They may be mixed with fillers, such as carbon black, graphite and talc, and with softeners, such as phthalic acid esters, and suitable pigments. To increase the stability of the polymers to light, heat, and oxygen, about 0.1 to 2% of a stabilizer may be added thereto. Such stabilizers are, for example, phenyl-beta-naphthylamine or di-(para-tertiary-butylphenol) sulfide. The usual accelerators may be added during the vulcanization.

It is desirable to use dry and very pure monomers in the practice of this invention to obtain higher molecular weight polymers. Also, the solvents should be dry. Therefore, it is desirable to use freshly distilled vinyl alkyl ether and alkoxy-1,3-butadiene. Normally, it is preferred to distill these monomers over metallic sodium wire to remove any impurities and to further insure against traces of moisture. The solvents are dried over a suitable dessicant such as aluminum oxide or phosphorous pentaoxide and then distilled.

In this specification and claims the various ingredients in the compounding recipes are expressed as parts per 100 parts (phr.) of the poly (vinyl alkyl ether). The tensile strength measurements on the vulcanizates were made at 25° C. with an Instron tester operating at a crosshead speed of 2 inches per minute and the samples used were of the standard dumbbell type about $\frac{1}{10}''$ x $\frac{1}{16}''$ in cross-section. Similarly the term "swell volume" as used herein is reported as the ratio of the volume of the swollen rubber after 70 hours contact at 25° C. with benzene containing 0.1 percent of the antioxidant, phenyl betanaphthylamine, to the volume of the dried rubber. The swell volume is reported after correcting for the volume of filler present in the rubber. The solubility values are expressed as percent by weight solubility of the vulcanizate corrected for filler after standing in benzene at 25° C. for 70 hours. The inherent viscosities on the copolymers were determined at 30° C. on a solution consisting of 0.1% by weight of copolymer dissolved in benzene and the values obtained are expressed as deciliters per gram.

The following examples will further illustrate this invention but the invention is not restricted to these examples. All parts are by weight unless otherwise stated.

Example 1

The polymerization was performed in a one-quart clean, dry bottle fitted with a screw cap containing a self-sealing liner. 500 parts by volume of dry pentane, 100 parts by volume of a dry, freshly distilled vinyl-n-butyl ether and 2 parts by volume of dry, freshly distilled 1-methoxy-1,3-butadiene were added to this bottle at 25° C. The contents of the bottle, sealed from the outside atmosphere, were cooled to 5° C. and then 2 parts by volume of a suspension consisting of 1% of aluminum hexahydrosulfate heptahydrate in dry decalin was injected from a syringe into the bottle through the self-sealing liner. The bottle was placed in a 5° C. water bath and tumbled end over end for 20 hours. At the end of this time, the polymer appeared as a solid viscous mass in the bottle. The polymer was precipitated with methanol containing 1% by weight of phenyl beta naphthylamine as a stabilizer. The precipitated polymer was separated and then dried under a vacuum. The recovered polymer had an inherent viscosity of 5.9 deciliters/gram at 30° C. when measured on a 0.1 percent solution in benzene. This polymer was obtained in an 83% yield based on the monomer mixture.

If more catalyst were used, the polymerization rates were faster. Therefore, the tumbling time can be reduced to less than 10 hours at the higher catalyst levels. Similarly, by carrying out the polymerization at a higher temperature, for instance 15° C. the tumbling time can be reduced even more.

Example 2

The polymer of Example 1 was milled to obtain a compounded product according to the following recipe.

| | Parts |
|---|---|
| Polymer | 100 |
| Carbon black (HAF) [1] | 50 |
| Stearic acid | 0.5 |
| Zinc oxide | 3.5 |
| Sulfur | 2 |
| Mercaptobenzothiazole | 1.4 |
| Tetramethylthiuram disulfide | 0.75 |

[1] HAF is a high abrasion furnace-type carbon black.

The compounded material was heated in a mold under pressure at 310° F. for 30 minutes. The cured resilient sample had the following physical properties:

| | |
|---|---|
| Tensile strength, p.s.i. | 1,390 |
| 300% modulus, p.s.i. | 625 |
| Elongation at break, percent | 605 |
| Shore Hardness A | 70 |
| Swell volume | 6.4 |
| Solubility, percent | 3 |

The tensile strength may be further improved by using a carbon black of the intermediate super abrasive furnace type and also by mixing the copolymer with carbon black in a heated Banbury.

Example 3

In this example, vinyl ethyl ether replaced the vinyl-n-butyl ether used in Example 1, and the amount of 1-methoxy-1,3-butadiene and catalyst suspension were each increased from two parts to three parts, respectively; otherwise, this experiment was performed in the same manner as Example 1. A polymer having at 30° C. an inherent viscosity of 4.2 deciliters per gram was obtained in 76% yield. This polymer, when compounded according to the curing recipe of Example 2 and cured, gave a vulcanizate having good physical properties.

Example 4

The copolymerization procedure of Example 1 is used in this example, except 1-methoxy-1,3-butadiene is replaced by 1-butoxy-1,3-butadiene, to give a sulfur curable elastomeric copolymer. 1-butoxy-1,3-butadiene may be used to replace the 1-methoxy-1,3-butadiene in Example 1 to obtain a sulfur curable elastomeric copolymer containing a pendent butoxy group and thereby improve the low temperature properties of the cured elastomer. Similarly, vinyl octyl ether may be used in place of vinyl-n-butyl ether of Example 1 to give an elastomer copolymer.

While certain representative embodiments and details have been shown for the purpose of illustrating the invention, it will be apparent to those skilled in this art that various changes and modifications may be made therein without departing from the spirit or scope of the invention.

What is claimed is:

1. A process for preparing a copolymer of vinyl alkyl ether and alkoxybutadiene comprising polymerizing in the presence of aluminum hexahydrosulfate hydrate a mixture comprising a vinyl alkyl ether having less than 12 carbon atoms in the alkyl group and an alkoxy-1,3-butadiene, containing from 1 to 6 carbon atoms in its alkoxy group.

2. The process of claim 1 wherein the mixture contains from 90 to 99.5 percent by weight of said vinyl alkyl ether.

3. The process of claim 1 wherein the mixture contains from 96 to 98 percent by weight of vinyl alkyl ether.

4. The process of claim 1 wherein on a vinyl alkyl ether basis at least 0.01 to 0.5 percent of aluminum hexahydrosulfate is present.

5. The process of claim 4 wherein the aluminum hexahydrosulfate and the reaction mixture are dispersed in 1 to 10 parts of an inert solvent for each part of vinyl alkyl ether.

6. An elastomeric copolymer of a vinyl alkyl ether containing an alkyl radical having less than about 12 carbon atoms and an alkoxy-1,3-butadiene containing an alkoxy radical having from 1 to 6 carbon atoms, inclusive, said copolymer being curable with sulfur to yield a vulcanizate having a tensile strength of at least 1000 pounds per square inch.

7. The copolymer of claim 6 which contains at least 90% and no more than 99.5% by weight of vinyl alkyl ether monomer.

8. The copolymer of claim 6 which contains at least 96% and no more than 98% by weight of vinyl alkyl ether.

9. A process for preparing a copolymer of vinyl ethyl ether and alkoxy-1,3-butadiene comprising polymerizing in the presence of aluminum hexahydrosulfate, a mixture comprising (1) at least a major portion of vinyl ethyl ether and a minor amount of alkoxy-1,3-butadiene having an alkoxy group containing from 1 to 6 carbon atoms.

10. A process for preparing a copolymer of vinyl n-butyl ether and alkoxy-1,3-butadiene comprising polymerizing in the presence of aluminum hexahydrosulfate, a mixture comprising a major portion of vinyl n-butyl ether and a minor amount of an alkoxy-1,3-butadiene having an alkoxy group containing from 1 to 6 carbon atoms.

11. A process for preparing a copolymer of vinyl n-hexyl ether and aloxy-1,3-butadiene comprising polymerizing in the presence of aluminum hexahydrosulfate, a mixture comprising a major portion of vinyl n-hexyl ether and a minor amount of an alkoxy-1,3-butadiene having an alkoxy group containing from 1 to 6 carbon atoms.

12. An elastomeric copolymer comprising a major portion of vinyl ethyl ether and a minor portion of an alkoxy-1,3-butadiene having an alkoxy radical containing from 1 to 6 carbon atoms, said copolymer being curable with sulfur to yield a vulcanizate having a tensile strength of at least 1000 pounds per square inch.

13. An elastomeric copolymer comprising a major portion of vinyl n-butyl ether and a minor portion of an alkoxy-1,3-butadiene having an alkoxy radical containing from 1 to 6 carbon atoms, said copolymer being curable with sulfur to yield a vulcanizate having a tensile strength of at least 1000 pounds per square inch.

14. An elastomeric copolymer comprising a major portion of vinyl n-hexyl ether and a minor portion of an alkoxy-1,3-butadiene having an alkoxy radical containing from 1 to 6 carbon atoms, said copolymer being curable with sulfur to yield a vulcanizate having a tensile strength of at least 1000 pounds per square inch.

References Cited in the file of this patent

UNITED STATES PATENTS

| | | |
|---|---|---|
| 2,189,529 | Carothers et al. | Feb. 6, 1940 |
| 2,344,085 | Halbig et al. | Mar. 14, 1944 |
| 2,462,703 | Young et al. | Feb. 22, 1949 |
| 2,573,678 | Saunders | Nov. 6, 1951 |
| 2,825,719 | Herrle et al. | Mar. 4, 1958 |
| 2,905,722 | Montagna | Sept. 22, 1959 |